(12) United States Patent
Maruyama

(10) Patent No.: US 11,169,896 B2
(45) Date of Patent: Nov. 9, 2021

(54) INFORMATION PROCESSING SYSTEM

(71) Applicant: FUJIFILM BUSINESS INNOVATION CORP., Tokyo (JP)

(72) Inventor: Yasuhiro Maruyama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 40 days.

(21) Appl. No.: 16/745,580

(22) Filed: Jan. 17, 2020

(65) Prior Publication Data

US 2021/0073098 A1 Mar. 11, 2021

(30) Foreign Application Priority Data

Sep. 9, 2019 (JP) .............................. JP2019-163959

(51) Int. Cl.
| | |
|---|---|
| *G06F 11/00* | (2006.01) |
| *G06F 11/30* | (2006.01) |
| *G06F 11/07* | (2006.01) |
| *G06F 11/32* | (2006.01) |

(52) U.S. Cl.
CPC ........ *G06F 11/3034* (2013.01); *G06F 11/008* (2013.01); *G06F 11/0772* (2013.01); *G06F 11/326* (2013.01)

(58) Field of Classification Search
CPC . G06F 11/3034; G06F 11/008; G06F 11/0772
See application file for complete search history.

(56) References Cited

U.S. PATENT DOCUMENTS

| | | | | |
|---|---|---|---|---|
| 4,034,194 A | * | 7/1977 | Thomas | G06F 11/1497 714/31 |
| 2006/0156141 A1 | * | 7/2006 | Ouchi | G06F 11/0793 714/742 |
| 2006/0174167 A1 | * | 8/2006 | Ito | G06F 11/0772 714/48 |
| 2008/0189578 A1 | * | 8/2008 | Raghuraman | G06F 11/004 714/47.1 |

(Continued)

FOREIGN PATENT DOCUMENTS

| | | |
|---|---|---|
| JP | 2008-250537 A | 10/2008 |
| JP | 2009-25958 A | 2/2009 |

(Continued)

*Primary Examiner* — Philip Guyton
(74) *Attorney, Agent, or Firm* — Oliff PLC

(57) ABSTRACT

An information processing system includes a failure information obtaining unit, a handling method definition holding unit, in each of which a handling method to be executed for a failure possible in the monitoring target system is described, a selection unit selecting a handling method definition corresponding to the failure occurred in the monitoring target system, an execution unit performing a handling process, a handling result determination unit determining whether a result of execution of the handling process by the execution unit is a predetermined result, and an output unit, if the handling result determination unit determines that the result of the execution is the predetermined result, outputting information indicating an operator need not perform a handling process and, if the handling result determination unit determines the result of the execution is not the predetermined result, outputting information indicating that the operator needs to perform a handling process.

9 Claims, 11 Drawing Sheets

(56) References Cited

U.S. PATENT DOCUMENTS

2012/0005520 A1* 1/2012 Ashraff ............... G06F 8/70
                                                                714/4.11
2021/0073098 A1* 3/2021 Maruyama .......... G06F 11/0772

FOREIGN PATENT DOCUMENTS

| JP | 2011-76161 A | 4/2011 |
|----|--------------|--------|
| JP | 2013-8178 A | 1/2013 |
| JP | 6027880 B2 | 11/2016 |
| JP | 2018-81403 A | 5/2018 |

* cited by examiner

FIG. 6A

| No. | ORDER OF APPLICATION | FILTERING CONDITION | EXPLANATION | HANDLING UNIT | PARAMETER | PROCESS FOR UPDATING FAILURE DATABASE | |
|---|---|---|---|---|---|---|---|
| | | | | | | EXPECTED | UNEXPECTED |
| 21 | 1 | xxx.invoker: endpoint timed out | TIME-OUT FROM COOPERATION SYSTEM | — | — | Status = COMPLETE<br>Substatus = COMPLETE<br>IncidentLevel = 3<br>Note = CORRESPONDS TO KNOWN ERROR No. 21 | — |
| 22 | 2 | Unexpected error | GENERATED BY FAILURE DATABASE ID 123 | AND | | | |
| | | | | OBTAIN AND REFER TO LOG | SPECIFIED TIME = 60 SECONDS<br>CONDITION = OR MORE BEFORE<br>FILTERING CONDITION = "PUT /aaa/bbb/cccc/" "<<FIELD 5>>"<br>EXPECT = THERE IS LOG | Status = COMPLETE<br>Substatus = WAITING FOR REVIEW<br>IncidentLevel = 3<br>Note = CORRESPONDS TO KNOWN ERROR No. 22 | Note = DOES NOT CORRESPONDS TO KNOWN ERROR No. 1<br>PUT 60 SECONDS OR MORE BEFORE: <<RESULT 1>><br>CONDUCT OPERATION CHECKING TEST: <<RESULT 2>> |
| | | | | CONDUCT OPERATION CHECKING TEST | TEST TARGET = <<FIELD 11>><br>EXPECT = TEST SUCCEEDS | <<CORRESPONDING ROW>> | |

FROM FIG.6A

| No. | ORDER OF APPLICATION | FILTERING CONDITION | EXPLANATION | HANDLING UNIT | PARAMETER | | PROCESS FOR UPDATING FAILURE DATABASE | |
|---|---|---|---|---|---|---|---|---|
| | | | | | | | EXPECTED | UNEXPECTED |
| 1 | 10 | * | PROCESS FOR UNKNOWN ERRORS | OBTAIN USER INFORMATION | <<FIELD 9>> | | Note = <<PROCESS RESULT>> | Note = <<PROCESS RESULT>> |
| 2 | 11 | * | PROCESS FOR UNKNOWN ERRORS | DETECT SERVICE | <<FIELD 11>> | EXPECT = THERE IS VALUE | AFFECTED SERVICE = <<VALUE>> | AFFECTED SERVICE = NOT DETERMINED |
| 3 | 12 | * | PROCESS FOR UNKNOWN ERRORS | CONDUCT OPERATION CHECKING TEST | <<FIELD 11>> | | Note = OPERATION CHECKING TEST SUCCEEDS | IncidentLevel = 2  Note = OPERATION CHECKING TEST FAILS (<<LIST>>) |

FIG. 11

| | FAILURE INVESTIGATION AND HANDLING | | | FAILURE DATABASE UPDATE RECORDS | |
|---|---|---|---|---|---|
| TIME | FAILURE DB ID | FUNCTION | PARAMETER | FACT | REASON |
| <TIME 1> | 123 | OBTAIN AND REFER TO LOG | F8E6002D70E457CE | 2018-12-19 06:19:16.178+0000,INFO, F8E6002D70E457CE---,---,---, PUT,/aaa/bbb/cccc/ | PUT,/aaa/bbb/cccc/ HAS OCCURRED 90 SECONDS AGO |
| <TIME 1> | 123 | OBTAIN AND REFER TO LOG | F8E6002D70E457CE | 2018-12-19 06:20:46.178+0000,ERROR,FATAL,, F8E6002D70E457CE---,---,---, ---,---,Unexpected Error--- | Unexpected Error |
| <TIME 2> | 123 | CONDUCT REGRESSION TEST | FUNCTION 1 | FUNCTION 1 Test succeeded. | |
| <TIME 3> | 124 | HIERARCHICAL/ FUNCTIONAL ESCALATION FUNCTION | FUNCTION 3-OPERATION ML, {internal error 500}, <TIME 3> | CONTENT OF MAIL | |
| | | | | | |

INFORMATION PROCESSING SYSTEM

CROSS-REFERENCE TO RELATED APPLICATIONS

This application is based on and claims priority under 35 USC 119 from Japanese Patent Application No. 2019-163959 filed Sep. 9, 2019.

BACKGROUND

(i) Technical Field

The present disclosure relates to an information processing system.

(ii) Related Art

A system has been proposed that identifies a corresponding or similar incident in accordance with an incident that has occurred in a target system and that assists handling of the incident.

Japanese Unexamined Patent Application Publication No. 2011-76161 discloses a process including automatically retrieving information stored in a database on the basis of information regarding an incident that has occurred in a target system, obtaining information including a procedure for handling a corresponding known incident, outputting the obtained information as information to be applied to the incident that has occurred in the target system, and displaying the information on an operator's terminal or notifying the operator of the information.

Japanese Unexamined Patent Application Publication No. 2013-8178 discloses a process including extracting a template identifier (ID) associated with an error message included in an incident received from a user computer system, extracting, from the template ID, argument information necessary to execute an operation template, extracting an argument of the operation template from a configuration management database on the basis of the argument information, and performing an operation process.

Japanese Unexamined Patent Application Publication No. 2018-81403 discloses a process including referring to a data holding unit that holds operation state information for each incident that has occurred in an information processing system and identifying an incident similar to an incident selected from a plurality of incidents.

SUMMARY

Handling of a failure that has occurred in a monitoring target system is cumbersome for an operator. Even in the case of a system that automatically handles known failures, failures similar to the known failures might require different types of handling. An operator therefore needs to determine a handling method and the necessity to handle a failure and actually handle the failure, which is cumbersome.

Aspects of non-limiting embodiments of the present disclosure relate to reduce a burden on an operator by, on the basis of known information, automatically handling a failure that has occurred in a monitoring target system and notifying the operator of the failure in accordance with a result of the handling.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system comprising: a failure information obtaining unit that obtains information regarding a failure that has occurred in a monitoring target system; a handling method definition holding unit that holds handling method definitions, in each of which a handling method to be executed for a failure possible in the monitoring target system is described; a selection unit that selects, on a basis of the information obtained by the failure information obtaining unit; a handling method definition corresponding to the failure that has occurred in the monitoring target system from the handling method definitions held by the handling method definition holding unit; an execution unit that automatically performs a handling process in accordance with the handling method definition selected by the selection unit; a handling result determination unit that determines whether a result of execution of the handling process by the execution unit is a predetermined result; and an output unit that, if the handling result determination unit determines that the result of the execution is the predetermined result, outputs information indicating that an operator need not perform a handling process and, if the handling result determination unit determines that the result of the execution is not the predetermined result, outputs information indicating that the operator needs to perform a handling process.

BRIEF DESCRIPTION OF THE DRAWINGS

An exemplary embodiment of the present disclosure will be described in detail based on the following figures, wherein:

FIGS. 6A and 6B are diagrams illustrating an example of handling method definitions;

FIG. 11 is a diagram illustrating an example of history information regarding handling processes performed by an operator through a manual operation.

DETAILED DESCRIPTION

An exemplary embodiment of the present disclosure will be described in detail hereinafter with reference to the accompanying drawings.

System Configuration

Figure 1:
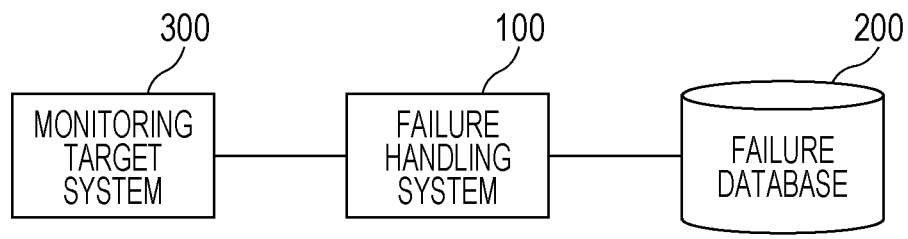
FIG. 1 is a diagram illustrating the overall configuration of an information processing system according to an exemplary embodiment.

FIG. 1 is a diagram illustrating the overall configuration of an information processing system according to the present exemplary embodiment. The information processing system according to the present exemplary embodiment includes a failure handling system 100, a failure database 200, and a monitoring target system 300.

The failure handling system 100 is an information processing system that monitors the monitoring target system 300. If a failure such as an error occurs in the monitoring target system 300, the failure handling system 100 handles the failure. If a failure that has occurred in the monitoring target system 300 can be handled through a handling process that can be performed automatically, the failure handling system 100 automatically performs the handling process. If it is difficult to handle a failure that has occurred in the monitoring target system 300 through a handling process that can be performed automatically, on the other hand, the failure handling system 100 notifies an operator of the monitoring target system 300 of the failure to prompt the operator to handle the failure.

The failure database 200 saves and manages information regarding failures that have occurred in the monitoring target system 300. The failure database 200 stores information obtained from occurrence of each failure to completion of handling of the failure. One of various database systems available through a network may be used as the failure database 200. If a database server such as a cloud server is used as the failure database 200, the database server needs to be operable from the outside (failure handling system 100) through an application programming interface (API). Although only one failure database 200 is illustrated in FIG. 1, a plurality of failure databases 200 may be provided, instead.

The monitoring target system 300 is an information processing system monitored by the failure handling system 100. The monitoring target system 300 may be any type of information processing system insofar as the failure handling system 100 can monitor the monitoring target system 300 and detect failures.

In the configuration illustrated in FIG. 1, the failure handling system 100 is achieved, for example, by a server provided in a network. The monitoring target system 300 may be achieved by a server provided in the network, or may be a local system insofar as the monitoring target system 300 is connected to the failure handling system 100 through the network. The failure handling system 100 and the monitoring target system 300 need not each be achieved by a single hardware device (a server machine, etc.), and may each be achieved by a plurality of hardware devices or virtual machines.

Functional Configuration of Monitoring Target System 300

Figure 2:
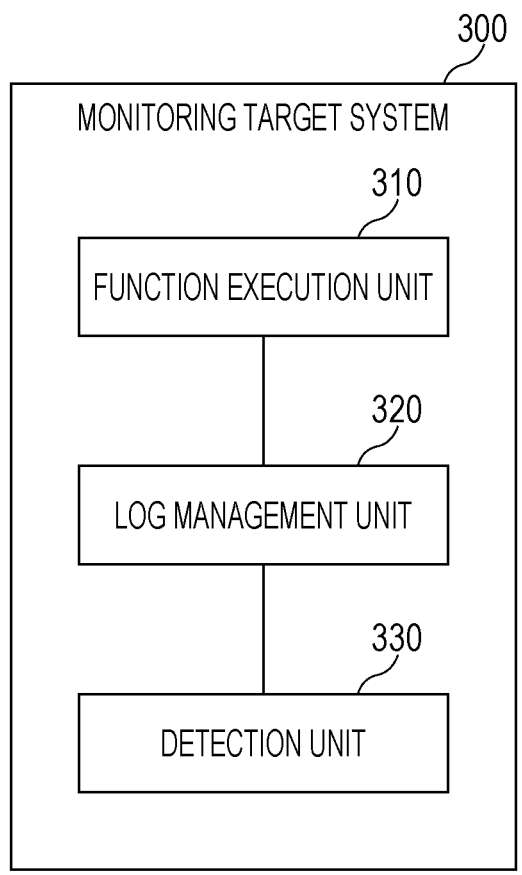
FIG. 2 is a diagram illustrating the functional configuration of a monitoring target system.

FIG. 2 is a diagram illustrating the functional configuration of the monitoring target system 300. The monitoring target system 300 includes a function execution unit 310, a log management unit 320, and a detection unit 330. The server that achieves the monitoring target system 300 is a computer, for example, and includes, as hardware, a central processing unit (CPU), which is arithmetic means, and internal and external storage devices (memories), which are storage means. The CPU loads a program stored in the external storage device into the internal storage device and executes the program. The internal storage device is, for example, a random-access memory (RAM). The external storage device is, for example, a magnetic disk or a solid-state drive (SSD).

The function execution unit 310 is achieved, for example, by executing an application program using the CPU. By controlling the application program, the function execution unit 310 performs data processing and control based on various functions. The function execution unit 310 also generates an operation log in accordance with a process or control performed.

The log management unit 320 saves and manages an operation log generated by the function execution unit 310. If a failure has occurred during a process or control performed by the function execution unit 310, information indicating the occurrence of the failure is also recorded in an operation log.

The detection unit 330 analyzes an operation log saved in the log management unit 320, detects certain character strings, and performs certain processes. The certain character strings appear in an operation log if a certain failure such as an error occurs in a process or control performed by the function execution unit 310. The certain character strings may include, for example, "fatal" and "severe". The certain process is a process to be performed if one of such character strings is detected in an operation log. The certain processes may include, for example, transmission of an electronic mail for notifying the operator of occurrence of a failure and notification of occurrence of a failure to the failure handling system 100.

The detection unit 330 transmits, to the failure handling system 100, a certain part of an operation log including a detected certain character string. A part of an operation log to be transmitted is determined, for example, in accordance with a type of character string detected or a type of failure identified.

Functional Configuration of Failure Handling System 100

Figure 3:
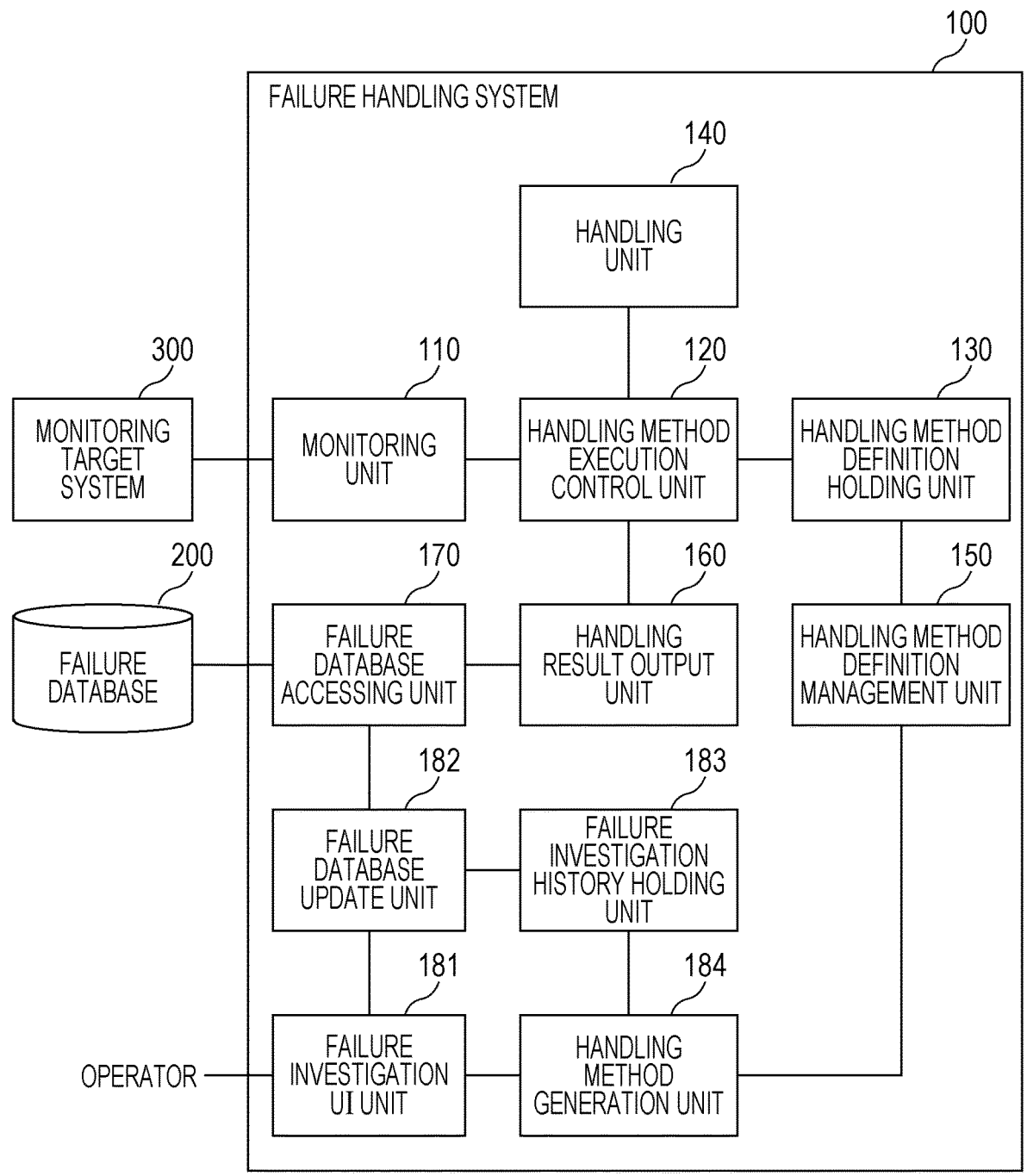
FIG. 3 is a diagram illustrating the functional configuration of a failure handling system.

FIG. 3 is a diagram illustrating the functional configuration of the failure handling system 100. The failure handling system 100 includes a monitoring unit 110, a handling method execution control unit 120, a handling method definition holding unit 130, a handling unit 140, a handling method definition management unit 150, a handling result output unit 160, and a failure database access unit 170. The failure handling system 100 also includes a failure investigation UI unit 181, a failure database update unit 182, a failure investigation history holding unit 183, and a handling method generation unit 184.

The monitoring unit 110 monitors the monitoring target system 300 and obtains an operation log from the detection unit 330. The operation log includes information regarding a failure that has occurred in the monitoring target system 300. Upon obtaining an operation log including information regarding a failure, the monitoring unit 110 activates the handling method execution control unit 120 for handling the failure. The monitoring unit 110 also accesses the failure database 200 through the failure database access unit 170 and registers the information regarding the failure obtained from the operation log to the failure database 200. The monitoring unit 110 is an example of a failure information obtaining unit.

The handling method execution control unit 120 determines a handling method to be used for a failure on the basis of failure information detected by the monitoring target system 300 and handling method definitions for failures and controls execution of the handling method. More specifically, first, the handling method execution control unit 120 selects a handling method definition corresponding to a failure that has occurred in the monitoring target system 300 on the basis of failure information recorded in an operation log obtained by the monitoring unit 110. The handling method execution control unit 120 then calls the handling unit 140 in accordance with the selected handling method definition and causes the handling unit 140 to automatically perform a handling process. A handling method definition refers to information regarding a handling method to be executed for a failure.

The selection of a handling method definition will be described in more detail hereinafter. The handling method execution control unit 120 selects a handling method definition corresponding to a failure that has occurred in the monitoring target system 300 on the basis of classification based on an occurrence condition of the failure that has occurred in the monitoring target system 300. An occurrence condition of a failure refers to a set of events that has occurred in the monitoring target system 300 until the occurrence of the failure. More specifically, an occurrence condition of a failure refers to times at which one or more certain events occurred, the number of times of occurrence, occurrence intervals, and the like. The handling method execution control unit 120 searches text of an operation log obtained by the monitoring unit 110 for predetermined character strings and classifies, on the basis of found character strings, an occurrence condition of a failure that has occurred in the monitoring target system 300. The handling method execution control unit 120 is an example of a selection unit.

The handling method definition holding unit 130 holds handling method definitions for failures. The handling method definition holding unit 130 is an example of a handling method definition holding unit. In each handling method definition, a handling method to be executed for a failure that can occur in a monitoring target system is described. More specifically, for example, a condition (filtering condition) for identifying a handling method to be applied on the basis of error information, an execution unit and parameters corresponding to the identified handling method, information to be written to the failure database 200 when a result of handling is as expected, and information to be written to the failure database 200 when the result of the handling is unexpected are described. Here, an expected result of handling is, for example, a state or a condition at a time when the monitoring target system 300 has recovered (returning to normal) through an automatic handling process. Details of the handling method definitions will be described later.

The handling unit 140 has specific processing functions called by the handling method execution control unit 120. The handling method execution control unit 120 and the handling unit 140 are an example of a handling process execution unit. Various functions are prepared as the processing functions of the handling unit 140 in accordance with types of failure. Details of the processing functions of the handling unit 140 will be described later.

The handling method definition management unit 150 manages the handling method definitions held by the handling method definition holding unit 130. The handling method definition management unit 150 adds handling method definitions generated by the handling method generation unit 184 to the handling method definition holding unit 130, updates existing handling method definitions with generated handling method definitions, and removes unnecessary handling method definitions.

The handling result output unit 160 determines whether a result of a handling process performed by the handling method execution control unit 120 and the handling unit 140 is as expected. The handling result output unit 160 also outputs a result of the determination and stores the result in the failure database 200 through the failure database access unit 170. More specifically, if determining that the result of the handling process is a predetermined result (as expected), the handling result output unit 160 outputs information indicating that the operator need not handle a failure and stores the information in the failure database 200. If determining that the result of the handling process is not a predetermined result (unexpected), on the other hand, the handling result output unit 160 outputs information indicating that the operator needs to handle the failure and stores the information in the failure database 200. The handling result output unit 160 is an example of a handling result determination unit and an example of an output unit.

The failure database access unit 170 accesses the failure database 200 and adds or updates information. More specifically, the failure database access unit 170 transmits a result of a determination made by the handling result output unit 160 to the failure database 200. The failure database access unit 170 also updates information saved in the failure database 200 as a result of control performed by the failure database update unit 182. The update of the failure database 200 performed by the failure database update unit 182 will be described later.

The failure investigation UI unit 181 generates an operation screen (UI screen) as a UI for investigating a failure. The failure investigation UI unit 181 transmits the generated operation screen to a terminal apparatus used by the operator and displayed on the terminal apparatus. With a UI provided by the failure investigation UI unit 181, the operator can call the various processing functions of the handling unit 140 to perform handling processes. That is, a process for handling a failure that has occurred in the monitoring target system 300 can be performed by the handling unit 140 through a manual operation performed by the operator on the operation screen, in addition to a handling process that can be achieved automatically by the handling method execution control unit 120. A result of a handling process performed using the operation screen is transmitted to the failure database update unit 182.

The UI provided by the failure investigation UI unit 181 receives an operation for inputting information regarding a handling process performed by the handling unit 140 for a failure in the monitoring target system 300 through a manual operation performed by the operator. The UI provided by the failure investigation UI unit 181 then causes the failure investigation history holding unit 183 to hold the input information. The UI provided by the failure investigation UI unit 181 presents an execution history held by the failure investigation history holding unit 183 to allow the operator to edit the execution history. The failure investigation history holding unit 183 will be described later. The failure investigation UI unit 181 is an example of an input operation reception unit and an example of an editing operation reception unit.

The failure database update unit 182 adds information transmitted from the failure investigation UI unit 181 to a failure investigation history. The failure database update unit 182 then accesses the failure database 200 through the failure database access unit 170 and updates the failure database 200 on the basis of the information added to the failure investigation history.

The failure investigation history holding unit 183 holds the failure investigation history in which information transmitted from the failure investigation UI unit 181 is recorded. More specifically, the failure investigation history holding unit 183 holds the execution history of handling processes when a handling process has been performed for a failure in the monitoring target system 300 through a manual operation performed by the operator. The failure investigation history holding unit 183 is an example of a handling history holding unit.

The handling method generation unit 184 generates a handling method definition for a failure on the basis of the execution history held by the failure investigation history holding unit 183. That is, the handling method generation unit 184 automatically generates a handling method definition while referring to the failure investigation history in case a failure similar to one that has occurred in the past should occur. More specifically, the operator identifies effective handling processes performed in the past through manual operations, and the handling method generation unit 184 generates a handling method definition such that the identified handling processes are performed in order of execution. The operator checks the automatically generated handling method definition, and if there is no problem, the handling method definition management unit 150 adds the handling method definition to the handling method definition holding unit 130. The handling method generation unit 184 is an example of a definition creation unit.

Processing Functions of Handling Unit 140

Figure 4:
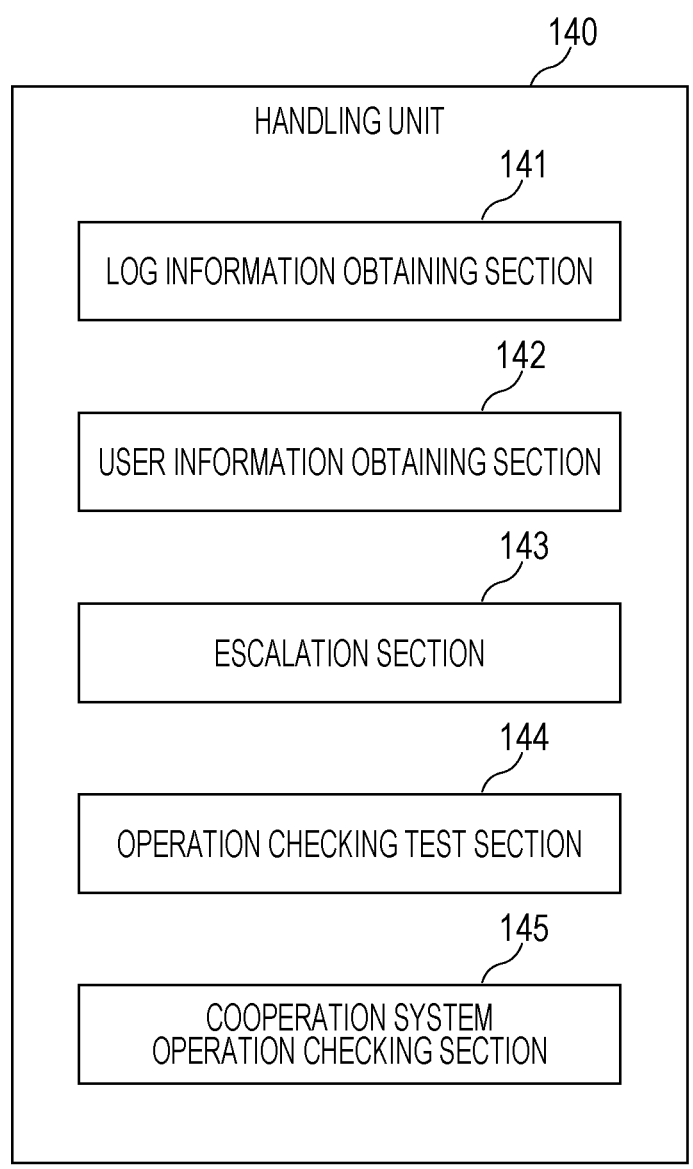
FIG. 4 is a diagram illustrating an example of processing functions of a handling unit.

FIG. 4 is a diagram illustrating an example of the processing functions of the handling unit 140. The handling unit 140 has the processing functions such as a log information obtaining section 141, a user information obtaining section 142, an escalation section 143, an operation checking test section 144, and a cooperation system operation checking section 145.

The log information obtaining section 141 is a function of obtaining log information (operation log) before and after a failure occurs. The log information obtaining section 141 obtains an operation log from the failure database 200 or the log management unit 320 of the monitoring target system 300.

The user information obtaining section 142 is a function of obtaining, from a user ID output to an operation log, attribute information regarding a user (hereinafter referred to as "user information") who has requested an operation recorded in the operation log. The user information includes, for example, a name of the user, a name of a group to which the user belongs, and information regarding authority given to the user. The user information may be identified from the user ID and obtained, and the configuration of a holding unit holding the user information is not particularly limited. For example, the user information may be held by the failure handling system 100 in advance or may be obtained from the monitoring target system 300 or an external user information database.

The escalation section 143 is a function of transmitting messages such as reports and requests to specified destinations. Electronic mailing, a tracking tool, a communication tool, or the like is used to transmit messages. "Escalation" refers to asking a staff member who has expert knowledge or higher authority to take measures to address a failure in the monitoring target system 300 as early as possible. Escalation is classified into functional escalation and hierarchical escalation. In hierarchical escalation, the operator asks his/her superior (a manager who has higher authority, etc.) to make a determination. Hierarchical escalation is employed, for example, when it is difficult to address a failure within a target period of time or cost is too high. In functional escalation, the operator requests a person in charge of development or someone else (a person who has expert knowledge) to conduct an investigation to address a failure. Functional escalation is employed, for example, when knowledge necessary to address an incident is lacking.

The operation checking test section 144 conducts an automatic test on the monitoring target system 300 in which occurrence of a failure has been detected. In the automatic test, the function execution unit 310 of the monitoring target system 300 checks whether application programs are operating normally. The automatic test may be, for example, a simple test for checking whether an application has stopped (a complete stop or a temporary stop), a test for checking operation with some typical scenarios, or the like.

The cooperation system operation checking section 145 is a function of checking whether a cooperation system of the monitoring target system 300 has stopped. A cooperation system is an external system that performs processes and control in cooperation with the monitoring target system 300 on the basis of a function of the monitoring target system 300. The cooperation system operation checking section 145 may directly check an operation state of a cooperation system or check whether the cooperation system has issued a maintenance alert.

The server that achieves the failure handling system 100 is a computer, for example, and includes a CPU, which is arithmetic means, and internal and external storage devices, which are storage means. The CPU loads a program stored in the external storage device into the internal storage device and executes the program. The internal storage device is, for example, a RAM. The external storage device is, for example, a magnetic disk or an SSD. The above-described functions, namely the monitoring unit 110, the handling method execution control unit 120, the handling unit 140, the handling method definition management unit 150, the handling result output unit 160, the failure database access unit 170, the failure investigation UI unit 181, the failure database update unit 182, and the handling method generation unit 184, are achieved by executing a program using the CPU. The handling method definition holding unit 130 and the failure investigation history holding unit 183 are achieved by the CPU, which executes programs, and the internal and external storage devices, which are storage means.

Operation of Failure Handling System 100

Figure 5:
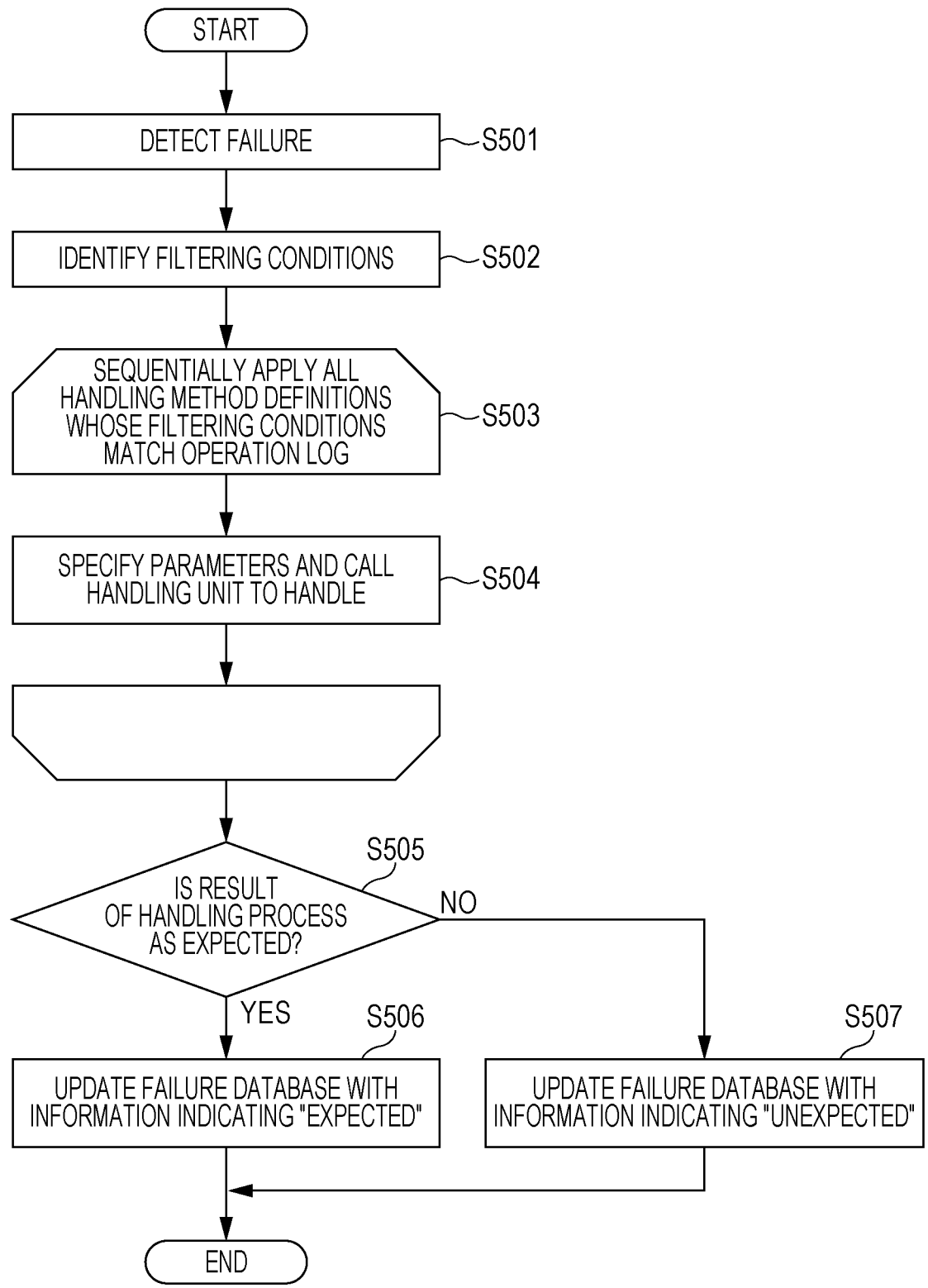
FIG. 5 is a flowchart illustrating the operation of the failure handling system.

FIG. 5 is a flowchart illustrating the operation of the failure handling system 100. If the detection unit 330 of the monitoring target system 300 detects a failure, the monitoring unit 110 of the failure handling system 100 obtains an operation log from the monitoring target system 300 and detects the occurrence of the failure (S501). The handling method execution control unit 120 then compares the obtained operation log with a filtering condition (a condition on which a handling method definition is applied) of each handling method definition to find filtering conditions that match the operation log (S502).

Next, the handling method execution control unit 120 sequentially applies all handling method conditions whose filtering conditions match the operation log. The handling method execution control unit 120 then specifies parameters according to a type of failure and calls the handling unit 140 to perform a handling process (S503 and S504). After all the handling method definitions whose filtering conditions match the operation log are applied, the handling result output unit 160 determines whether a result of the handling process is as expected (S505). If so (YES in S505), the handling result output unit 160 accesses the failure database 200 through the failure database access unit 170 and updates the failure database 200 with information indicating "expected" (S506). If not (NO in S505), the handling result output unit 160 accesses the failure database 200 through the failure database access unit 170 and updates the failure database 200 with information indicating "unexpected" (S507).

Example of Configuration of Handling Method Definitions

FIGS. 6A and 6B are diagrams illustrating an example of the handling method definitions. The handling method definitions illustrated in FIGS. 6A and 6B each include a definition number ("No."), "order of application", "filtering condition", "explanation", "handling unit", "parameter", and "process for updating failure database". The definition number ("No.") is identification information regarding each handling method definition. "Order of application" is order of application of the handling method definitions at a time when filtering conditions of a plurality of handling method definitions match an operation log. For example, among the handling method definitions whose filtering conditions match the operation log, ones whose values of the order of application are smaller are applied earlier.

"Filtering condition" is a condition on which each handling method definition is applied. More specifically, a character string that appears in an operation log is used as a filtering condition. A handling method definition whose definition number is 21 illustrated in FIG. 6A, for example, is applied if an operation log includes a character string "xxx.invoker: endpoint timed out". "Explanation" is an explanation of a corresponding filtering condition. An explanation is provided for the operator to understand a corresponding filtering condition. In the case of the handling method definition whose definition number is 21, for example, the explanation indicates that a description in an operation log specified in the corresponding filtering condition means that a time-out has occurred in communication with a cooperation system ("time-out from cooperation system" in FIG. 6A). No filtering conditions are specified for handling method definitions whose definition numbers are 1 to 3. These handling method definitions, therefore, are applied if a filtering condition of no other handling method matches an operation log. Explanations of these handling method definitions indicate that the handling method definitions are processes for unknown errors.

"Handling unit" is a processing function of the handling unit 140 executed (called) when each handling method definition is applied. When a handling method definition whose definition number is 22 in FIG. 6A is applied, for example, a processing function of the handling unit 140 for obtaining and referring to an operation log ("obtain and refer to log" in FIG. 6A) and a processing function of the handling unit 140 for conducting an operation checking test ("conduct operation checking test" in FIG. 6A) are called and executed. In the example illustrated in FIG. 6A, an attribute "AND" is given to "handling unit", and both the processing functions, not one of the processing functions, are executed.

"Parameter" specifies one or more parameters necessary for a handling process performed by the handling unit 140. When the handling process "obtain and refer to log" is executed on the basis of the handling method definition whose definition number is 22 illustrated in FIG. 6A, for example, "specified time=60 seconds", "condition=or more before", "filtering condition="PUT,/aaa/bbb/cccc/"<<field 5>>", and "expect=there is log" are specified as parameters. Whether there is a character string "PUT,/aaa/bbb/cccc/" in field 5 of an operation log 60 seconds or more before a character string "Unexpected Error", which is a filtering condition of the definition number 22, appears in the operation log, therefore, is determined. If so, a result of the handling process is expected, and if not, the result of the handling process is unexpected. When a handling process "obtain user information" is executed on the basis of the handling method definition whose definition number is 1, on the other hand, information described in field 9 of an operation log is obtained since "field=9" is specified as a parameter.

"Process for updating failure database" is a process for updating the failure database 200 performed after a handling process is performed. The process for updating the failure database 200 may be a process at a time when a result of the handling process is as expected or a process at a time when the result of the handling process is unexpected. If results of handling processes are as expected after the handling processes are executed on the basis of the handling method definition whose definition number is 22 illustrated in FIG. 6A, for example, information "Status=complete", "Substatus=waiting for review", "IncidentLevel=3", "Note=corresponds to known error No. 22", and "<<corresponding row>>" is recorded in the failure database 200. The information "<<corresponding row>>" indicates a row of an operation log in which a character string "Unexpected Error", which is the filtering condition of the definition number 22, appears. If the results of the handling processes are unexpected, on the other hand, information "Note=does not correspond to known error No. 22", "PUT: <<result 1>>60 seconds or more before", "conduct operation checking test: <<result 2>>" is recorded in the failure database 200.

Depending on the handling method definition, some items may be blank. In the case of the handling method definition whose definition number is 21 illustrated in FIG. 6A, for example, no handling process is performed even if the filtering condition is satisfied, and information "Status=complete", "Substatus=complete", "IncidentLevel=3", and "Note=corresponds to known error No. 21" is recorded in the failure database 200. Since a handling process is not performed, "handling unit" and "parameter" are blank. In "process for updating failure database", the above information is described as a process for an expected result, but no information is described for an unexpected result.

Examples of Application of Handling Method Definition

The operation of the failure handling system 100 that employs the handling method definitions illustrated in FIGS. 6A and 6B will be described. An example of a simple operation in which the handling unit 140 is not called and an example of a complex operation in which the handling unit 140 performs handling processes will be described. In the former example, the handling method definition whose definition number is 21 illustrated in FIG. 6A is applied, and in the latter example, the handling method definition whose definition number is 22 is applied.

Example of Operation when Handling Method Definition Whose Definition Number is 21 is Applied It is assumed in the operation of the monitoring target system 300 that a time-out has occurred with regard to a response from a cooperation system and this event has been detected as a failure. If an operation log detected first includes the character string "xxx.invoker: endpoint timed out", the handling method definition whose definition number is 21 is applied. In this case, a type of failure can be identified without calling the handling unit 140. In this event, a time-out has occurred in a communication path between the monitoring target system 300 and the cooperation system, that is, between a client and a server. In such a case, there is no handling process to be performed by the operator, and no recovery work needs to be performed. Handling of the failure is therefore completed just by leaving a record in the failure database 200.

Example of Operation when Handling Method Definition Whose Definition Number is 22 is Applied A failure is detected in the operation of the monitoring target system 300, the monitoring unit 110 obtains an operation log, and the handling method execution control unit 120 checks the operation log. In this event, the following conditions are identified.
1. The detected operation log includes a character string "Unexpected Error" (refer to "filtering condition").
2. A log having the same request ID (output to field 5) and including a character string "PUT,/aaa/bbb/cccc/" has been output 60 seconds or more ago (refer to "parameter").
3. An operation checking test ends normally. A test target is output to field 11 (refer to "parameter").

A process is performed in the following procedure.
(1) Check whether the obtained operation log includes a character string "Unexpected Error" through a character string search. If so, apply the handling method definition whose definition number is 22 and call the handling unit 140 to perform a handling process.
(2) Obtain a value from a fifth field of the operation log. It is assumed here that a request ID is described in the fifth field.
(3) If there is an obtained value (request ID) and there is an operation log (row) in which a character string "PUT,/aaa/bbb/cccc" is output 60 seconds or more before the occurrence of the failure ("expect=there is log"), a result of the handling process is as expected. If there is such a log 120 seconds before the occurrence of the failure, for example, the result of the handling process is as expected, and if there is such a log 30 seconds before the occurrence of the failure, the result of the handling process is unexpected.
(4) Obtain a value from an eleventh field of the operation log. It is assumed here that a code for identifying a target of an operation checking test is described in the eleventh field.
(5) Conduct the operation checking test with the obtained value (identification code) specified as a test target parameter. If a result of the operation checking test is successful ("expect=test succeeds"), the result of the handling process is as expected.
(6) If both the results (AND) of the operation log and the operation checking test are as expected, determine the failure as a known error. Update failure information in the failure database 200 with information indicating "expected" and end the handling of the failure. In other cases, update the failure information in the failure database 200 with information indicating "unexpected" and end the handling of the failure.

Example of Configuration of Failure Investigation UI Screen

Next, UI screens provided by the failure investigation UI unit 181 will be described. The UI screens are displayed on a display device of the terminal apparatus (not illustrated) used by the operator. The terminal apparatus of the operator is connected to the failure handling system 100. The terminal apparatus obtains the UI screens from the failure investigation UI unit 181 and displays the UI screens. The terminal apparatus receives operations performed by the operator using the UI screens and gives instructions to the handling method generation unit 184 and the failure database update unit 182. The operator performs operations using an input device such as a keyboard, a mouse, or a touch panel.

Figure 7:
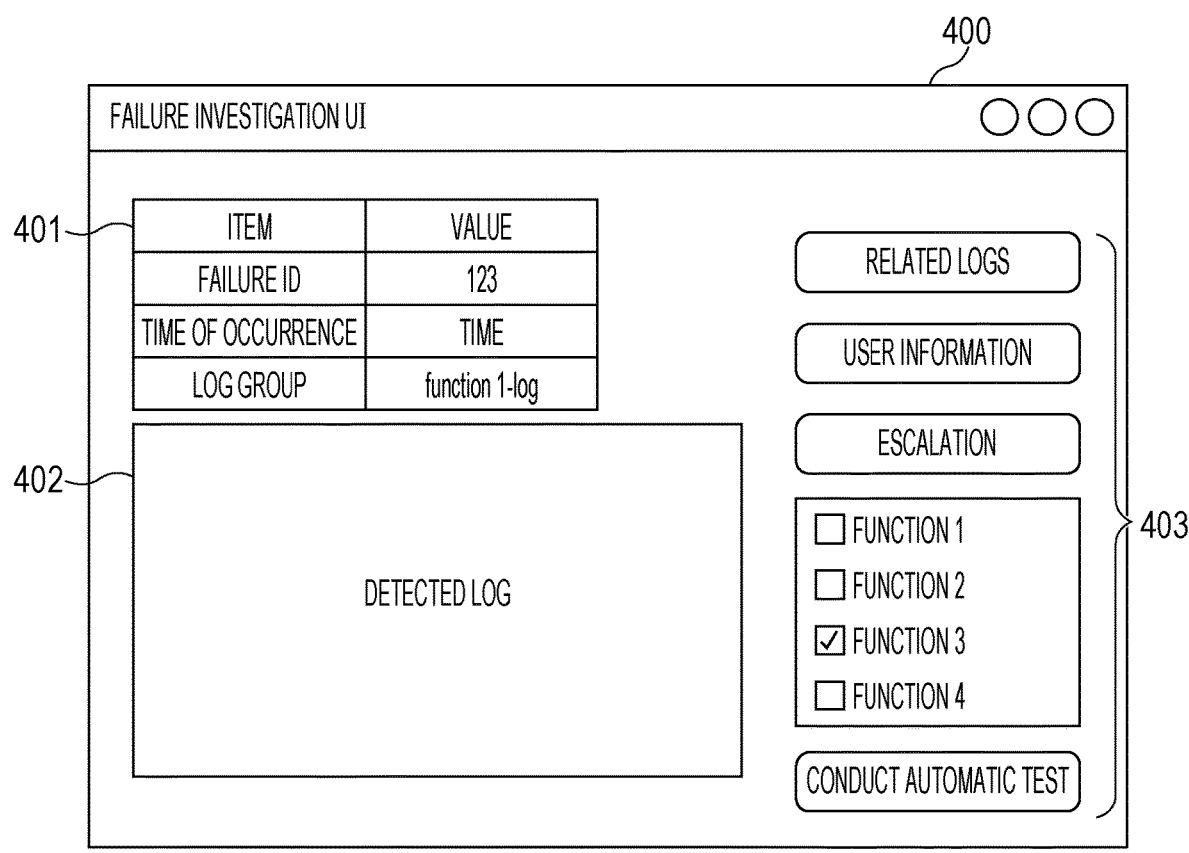
FIG. 7 is a diagram illustrating an example of an operation screen as a user interface (UI) screen.

FIG. 7 is a diagram illustrating an example of an operation screen as one of the UI screens. An operation screen 400 includes a failure field 401, a log field 402, and operation objects 403. In the failure field 401, information regarding a detected failure is displayed. In the example illustrated in FIG. 7, a failure ID, time of occurrence, and a log group including an operation log in which the failure is described are displayed. In the log field 402, the operation log in which the failure has been detected is displayed.

The operation objects 403 are used by the operator to request a handling process through a manual operation. In the example illustrated in FIG. 7, the operation objects 403 include four button objects "related logs", "obtain user information", "escalation", and "conduct automatic test" and checkboxes for selecting a function (handling unit 140) of conducting an automatic test are provided.

The "related logs" button is an operation object 403 for obtaining and displaying operation logs (hereinafter referred to as "related logs") relating to the operation log displayed in the failure field 401 and the log field 402. If the "related logs" button is used, a related log display screen is displayed. The "obtain user information" button is an operation object 403 for obtaining user information. If the "obtain user information" button is used, information regarding a user who has requested an operation recorded in the operation log is obtained. The "escalation" button is an operation object 403 for performing escalation. If the "escalation" button is used, an escalation screen is displayed. The "conduct automatic test" button is an operation object 403 for conducting an automatic test. If the "automatic test" button is used, an automatic test is conducted by a function (handling unit 140) selected using a checkbox, and then a result screen, which presents a result of the automatic test, is displayed.

Figure 8:
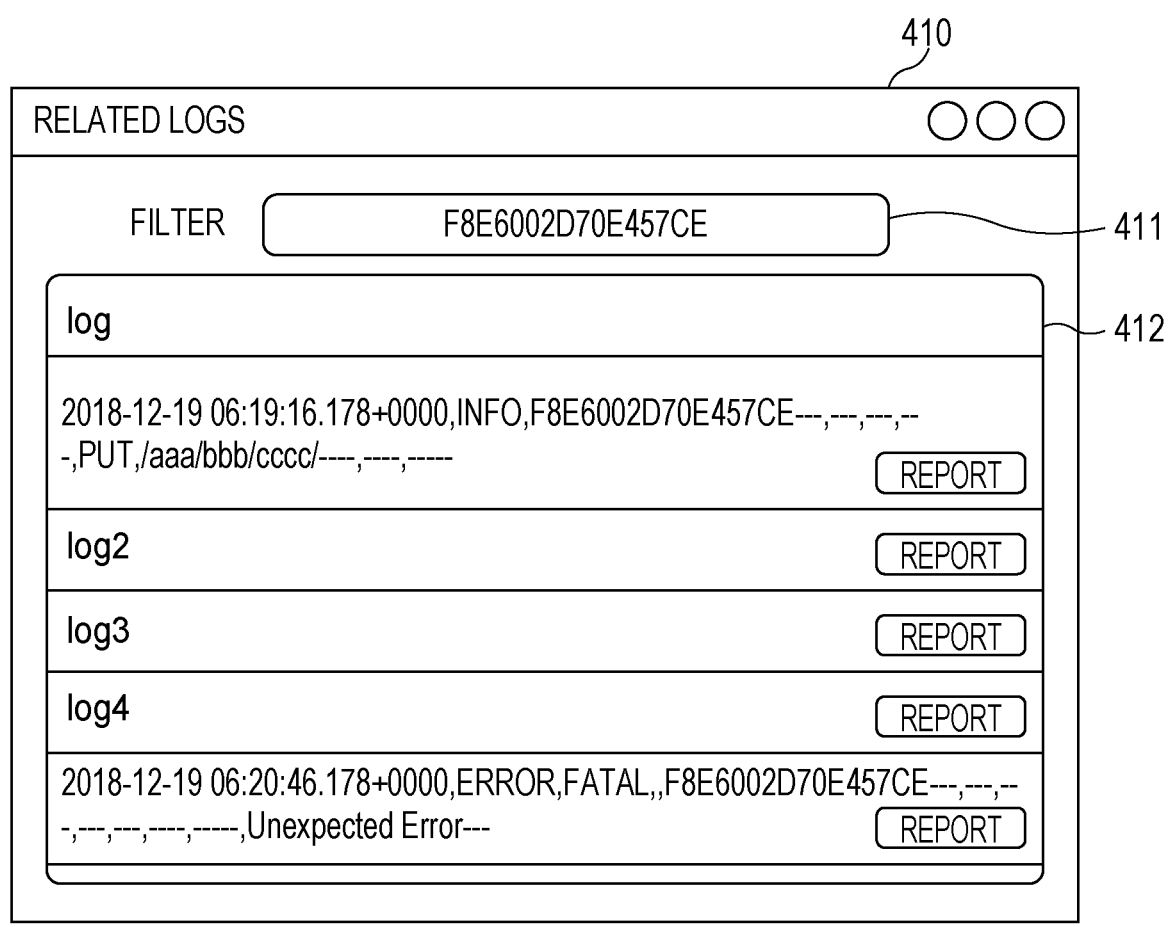
FIG. 8 is a diagram illustrating an example of a related log display screen.

FIG. 8 is a diagram illustrating an example of the related log display screen. A related log display screen 410 includes a filter field 411 and a log field 412. In the filter field 411, a character string that serves as a filter for obtaining related logs is displayed. In the log field 412, related logs including the character string displayed in the filter field 411 are displayed. That is, operation logs found as a result of a search based on a character string displayed in the filter field 411 as a search key are displayed in the log field 412 as related logs. In the example illustrated in FIG. 8, a character string "F8E6002D70E457CE" is displayed in the filter field 411, and five operation logs identified with this filter are displayed in the log field 412 as related logs.

It is assumed here that the filtering condition of the handling method definition whose definition number is 22 illustrated in FIG. 6A is applied to the operation log in which the failure is described. In the example illustrated in FIG. 8, a fifth operation log, which is a related log, displayed in the log field 412 includes a character string "Unexpected Error", which is the filtering condition of the handling method definition whose definition number is 22. Whether there is a character string "PUT,/aaa/bbb/cccc/" in field 5 of the operation log 60 seconds or more before the character string "Unexpected Error" appears in the operation log is also checked. A first related log is recorded 90 seconds before the fifth related log, and field 5 of the first related log includes the character string "PUT,/aaa/bbb/cccc/". The first and fifth operation logs, therefore, are identified as operation logs relating to the failure. A "report" button is provided for a display area of each related log, and if the operator uses the "report" button, information indicating that a related log in a corresponding display area relates to the failure is transmitted to the failure database update unit 182 and the handling method generation unit 184 of the failure handling system 100.

Second to fourth operation logs are displayed in the log field 412 in FIG. 8 since these operation logs include the character string "F8E6002D70E457CE", but the operation logs do not relate to the failure. These logs are therefore abbreviated as "log 2", "log 3", and "log 4", respectively, in FIG. 8, and not described specifically.

Figure 9:
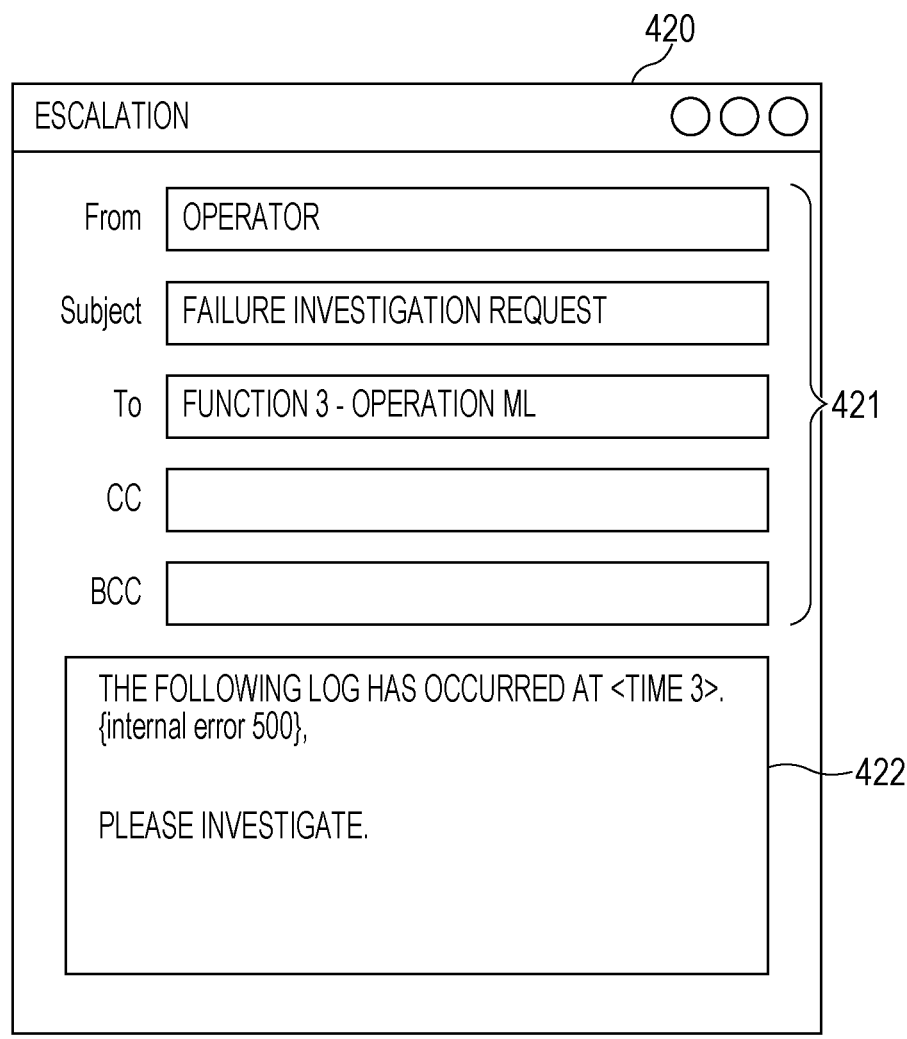
FIG. 9 is a diagram illustrating an example of an escalation screen.

FIG. 9 is a diagram illustrating an example of the escalation screen. An escalation screen 420 includes a bibliographical information input field 421 and a message input field 422. In the example illustrated in FIG. 9, electronic mailing is used for a notification about escalation. In the bibliographical information input field 421, input boxes for inputting bibliographical information such as a source (From), a subject (Subject), and a destination (To) of a message are provided. In the message input field 422, an input box for inputting a message to an escalation target is provided.

Figure 10:
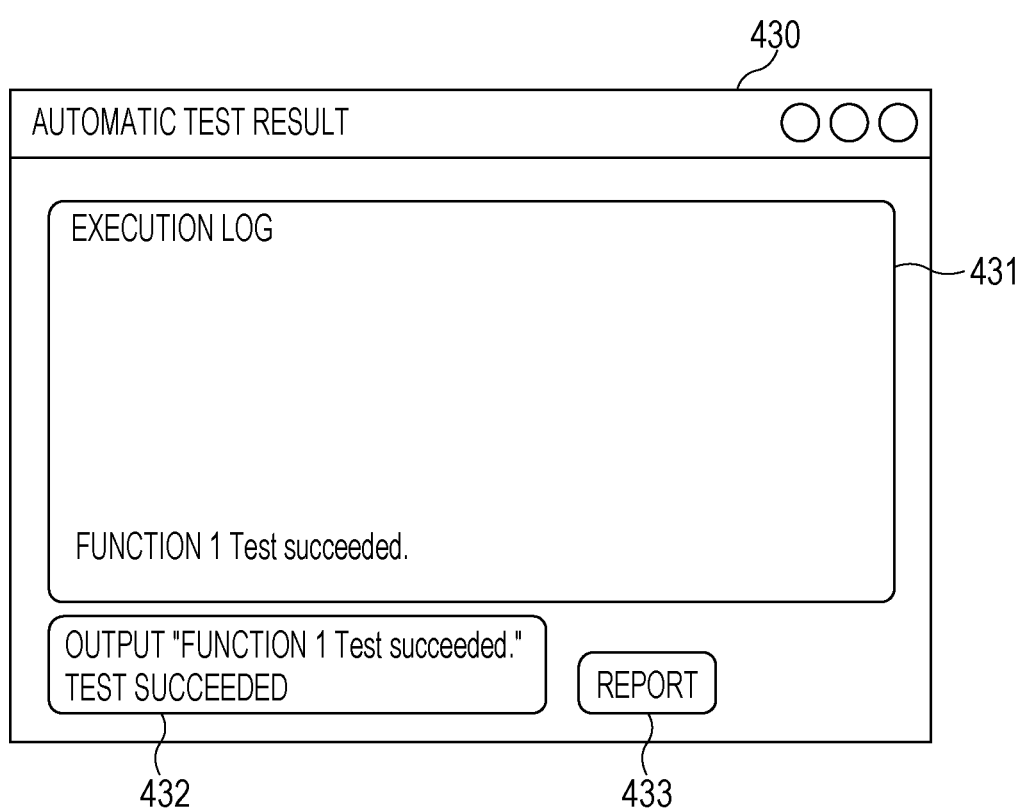
FIG. 10 is a diagram illustrating an example of a result screen.

FIG. 10 is a diagram illustrating an example of the result screen. A result screen 430 includes an execution log field 431, a result field 432, and a "report" button 433. In the execution log field 431, an execution log of an automatic test is displayed. In the example illustrated in FIG. 10, a character string "Function 1 Test succeeded", which indicates that an automatic test based on function 1 (refer to FIG. 7) selected in the operation screen 400 has been successfully completed is described in the execution log. In the result field 432, a result of the automatic test is displayed. In the example illustrated in FIG. 10, a message indicating that the automatic test has been successfully completed is described on the basis the execution log. The "report" button 433 is an operation object for transmitting the result of the automatic test to the failure handling system 100. If the operator uses the "report" button 433, the result of the automatic test is transmitted to the failure database update unit 182 and the handling method generation unit 184 of the failure handling system 100.

When a handling process has been completed through a manual operation performed by the operator using the UI screens illustrated in FIGS. 7 to 10, history information regarding the handling process is held by the failure investigation history holding unit 183. The handling method generation unit 184 then generates a new handling method definition on the basis of the history information and the operations performed by the operator and received by the failure investigation UI unit 181.

FIG. 11 is a diagram illustrating an example of the history information regarding handling processes performed by the operator through manual operations. The history information includes times at which pieces of the history information have been recorded, IDs of failure databases 200 ("failure database ID" in FIG. 11), information indicating investigations and handling processes actually performed for failures ("failure investigation and handling" in FIG. 11), and records of update of the failure database 200. The IDs of the failure databases 200 are used to identify the individual failure databases 200 when there are a plurality of failure databases 200. As the information indicating investigations and handling processes, executed functions and parameters used to execute the functions are recorded. As the records of the update of the failure database 200, facts and reasons are recorded. "Facts" refers to operations performed by the operator using the UI screens. "Reasons" refers to reasons why the operator has performed the operations described as the facts.

Although the exemplary embodiment of the present disclosure has been described, the technical scope of the present disclosure is not limited to the above exemplary embodiment. For example, in the above exemplary embodiment, the detection unit 330 of the monitoring target system 300 detects a failure and transmits an operation log to the monitoring unit 110 of the failure handling system 100. The detection unit 330, however, need not be provided for the monitoring target system 300, and the monitoring unit 110 of the failure handling system 100 may obtain an operation log from the monitoring target system 300 and detect a failure, instead. Alternatively, the monitoring unit 110 need not be provided for the failure handling system 100, and the handling method execution control unit 120 of the failure handling system 100 may obtain only an operation log including information regarding a failure detected by the detection unit 330 of the monitoring target system 300, instead, in order to perform a handling process. In addition, various modifications and alterations to the configuration that do not deviate from the technical scope of the present disclosure are included in the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor programmed to function as:
a failure information obtaining unit that obtains information regarding a failure that has occurred in a monitoring target system;
a handling method definition holding unit that holds handling method definitions, in each of which a handling method to be executed for a failure possible in the monitoring target system is described, the handling method definitions applied based upon a filtering condition that determines whether a predetermined character string is provided in an operation log;
a selection unit that selects, on a basis of the information obtained by the failure information obtaining unit, a handling method definition corresponding to the failure that has occurred in the monitoring target system from the handling method definitions held by the handling method definition holding unit;
an execution unit that automatically performs a handling process in accordance with the handling method definition selected by the selection unit;
a handling result determination unit that determines whether a result of execution of the handling process by the execution unit is a predetermined result; and
an output unit that, if the handling result determination unit determines that the result of the execution is the predetermined result, outputs information indicating that an operator need not perform a handling process and, if the handling result determination unit determines that the result of the execution is not the predetermined result, outputs information indicating that the operator needs to perform a handling process, wherein the output unit further provides an explanation of the filtering condition.

2. The information processing system according to claim 1,
wherein the selection unit selects, in accordance with classification based on an occurrence condition of an event that has occurred in the monitoring target system, the handling method corresponding to the failure that has occurred in the monitoring target system.

3. The information processing system according to claim 2,
wherein the failure information obtaining unit obtains an operation log of the monitoring target system, and
wherein the selection unit searches text of the operation log obtained by the failure information obtaining unit for a predetermined character string and classifies the occurrence condition of the event that has occurred in the monitoring target system using the found predetermined character string.

4. The information processing system according to claim 1, wherein the processor is further configured to function as:
a handling history holding unit that, if the operator has performed a handling process for the failure that has occurred in the monitoring target system, holds a history of execution of the handling process; and
a definition creation unit that creates the handling method definition corresponding to the failure on a basis of the history of the execution of the handling process held by the handling history holding unit.

5. The information processing system according to claim 4, wherein the processor is further configured to function as:
an editing operation reception unit that presents the history of the execution of the handling process by the handling history holding unit and receives an editing operation performed by the operator.

6. The information processing system according to claim 4, wherein the processor is further configured to function as:
an input operation reception unit that receives an operation for inputting information regarding the handling process performed by the operator for the failure that has occurred in the monitoring target system,
wherein the handling history holding unit holds the information received by the input operation reception unit as at least part of the history of the execution of the handling process.

7. An information processing system comprising:
failure information obtaining means for obtaining information regarding a failure that has occurred in a monitoring target system;
handling method definition holding means for holding handling method definitions, in each of which a handling method to be executed for a failure possible in the monitoring target system is described, the handling method definitions applied based upon a filtering condition that determines whether a predetermined character string is provided in an operation log;
selection means for selecting, on a basis of the information obtained by the failure information obtaining means, a handling method definition corresponding to the failure that has occurred in the monitoring target system from the handling method definitions held by the handling method definition holding means;
execution means for automatically performing a handling process in accordance with the handling method definition selected by the selection means;
handling result determination means for determining whether a result of execution of the handling process by the execution means is a predetermined result; and
output means for, if the handling result determination means determines that the result of the execution is the predetermined result, outputs information indicating that an operator need not perform a handling process and, if the handling result determination means determines that the result of the execution is not the predetermined result, outputs information indicating that the operator needs to perform a handling process, wherein the output means further provides an explanation of the filtering condition.

8. The information processing system according to claim 1, wherein the handling result determination unit determines that the result of the execution is the predetermined result by determining whether the character string had been output a predetermined time or more before the occurrence of the failure.

9. The information processing system according to claim 1, wherein the output unit is configured to allow the operator to request escalation in the case that the execution is not the predetermined result, the escalation including at least one of a hierarchical escalation and a functional escalation.

* * * * *